US009158565B2

(12) United States Patent
Jakoljevic et al.

(10) Patent No.: US 9,158,565 B2
(45) Date of Patent: Oct. 13, 2015

(54) PREDICTABLE COMPUTING IN VIRTUALIZATED DISTRIBUTED COMPUTER SYSTEMS BASED ON PARTITIONING OF COMPUTATION AND COMMUNICATION RESOURCES

(75) Inventors: Mirko Jakoljevic, Vienna (AT); Astrit Ademaj, Vienna (AT)

(73) Assignee: FTS Computertechnik GmbH, Vienna (AT)

( * ) Notice: Subject to any disclaimer, the term of this patent is extended or adjusted under 35 U.S.C. 154(b) by 162 days.

(21) Appl. No.: 14/000,383

(22) PCT Filed: Feb. 22, 2012

(86) PCT No.: PCT/AT2012/050023
§ 371 (c)(1),
(2), (4) Date: Aug. 19, 2013

(87) PCT Pub. No.: WO2012/113007
PCT Pub. Date: Aug. 30, 2012

(65) Prior Publication Data
US 2013/0332926 A1    Dec. 12, 2013

(30) Foreign Application Priority Data

Feb. 22, 2011  (AT) ................................. A 242/2011
Dec. 12, 2011  (AT) ................................. A 1823/2011

(51) Int. Cl.
| | |
|---|---|
| *G06F 9/455* | (2006.01) |
| *G06F 9/46* | (2006.01) |
| *G06F 9/48* | (2006.01) |
| *G06F 9/50* | (2006.01) |
| *H04L 12/931* | (2013.01) |

(52) U.S. Cl.
CPC .......... *G06F 9/45533* (2013.01); *G06F 9/4887* (2013.01); *G06F 9/5077* (2013.01); *H04L 49/70* (2013.01); *G06F 2009/45595* (2013.01)

(58) Field of Classification Search
CPC ....................... C06F 2009/4557; G06F 9/5077
See application file for complete search history.

(56) References Cited

U.S. PATENT DOCUMENTS 5,428,555 A * 6/1995 Starkey et al. ................ 700/275

* cited by examiner

*Primary Examiner* — Camquy Truong
(74) *Attorney, Agent, or Firm* — KPPB LLP

(57) ABSTRACT

The invention relates to a method for providing guaranteed quality of service in distributed computing platforms for execution of distributed applications, by combining: i) a partitioned operating system (POS) or a hypervisor (101) executed on at least two computers (300,301); where said POS/hypervisor allocates the CPU, memory and I/O hardware resources to computer partitions in said computers; where said computers are capable of executing different computer partitions (104, 105, 106) with different application tasks within one said computer partition or executing different operating systems (in case of hypervisor) within one said computer partition; wherein the said POS/hypervisor ensures that the application tasks executed in different partitions within the same said computer get their allocated hardware resources; wherein said POS/hypervisor performs a time-driven scheduling for a subset of computer partitions based on a given configuration (136), ii) means, for example network communication technology, for implementing partitioning of Ethernet communication resources and creating virtualized networks out of one physical network.

11 Claims, 5 Drawing Sheets

Figure 1:
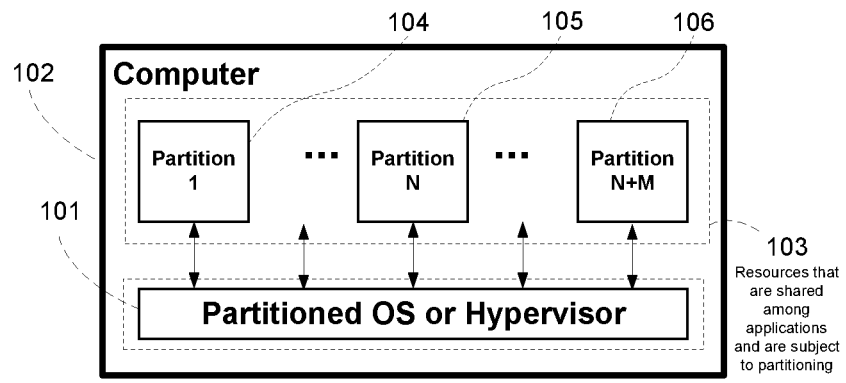

PREDICTABLE COMPUTING IN VIRTUALIZATED DISTRIBUTED COMPUTER SYSTEMS BASED ON PARTITIONING OF COMPUTATION AND COMMUNICATION RESOURCES

CROSS REFERENCE TO RELATED APPLICATIONS

This application is a national phase 35 U.S.C. §371 filing of PCT application No. PCT/AT2012/050023 filed Feb. 22, 2012, which claims priority to Austrian application No. A 242/2011 filed Feb. 22, 2011, and also claims priority to Austrian application No. A 1823/2011 filed Dec. 12, 2011. The disclosures of these applications are hereby incorporated herein by reference in their entirety.

A major challenge in virtualized environments is the design of distributed computer systems that enable the execution of applications in two or more partitions on two or more virtualized computers, and which also allow predictable use of shared computing and networking resources and predictable application execution, independent of the total system workload.

Virtualization is a widely used approach for sharing computing resources among different applications in one processing unit. It requires resource partitioning (separation) and software abstraction (layering), i.e., execution of software in an environment separated from the underlying hardware resources. On the other hand, new communication technologies are being developed that enable partitioning of the communication resources in virtual networks, such that the communication network provides guarantees with respect to end-to-end latency independent of the traffic load. By scheduling the execution of different partitions aligned to the network communication with a reference to a global time base which is provided by the communication network, operation of time-critical, mission-critical, and safety-critical applications can be executed independently of the usage of remaining resources. Computing and networking resource reservation for a specific set of partitions, which are executed in specific order at a specified time can provide services with real-time guarantees for critical applications. Computing and networking resources for non-critical partitions provide the non-critical services on a best-effort basis.

In this work we propose a new computer architecture that combines i) a communication network that allows partitioning of the communication resources together and ii) a partitioned operating system that allows virtualization of computer resources in order to achieve service guarantees for critical services, while maximizing the utilization of the hardware computer and communication resources by executing non-critical applications on the same hardware infrastructure.

INTRODUCTION

Virtualization is a method for partitioning of computational resources (CPU, memory, disk and I/O) in order to allow execution of different application software on the same physical computer hardware, by guaranteeing specified resource allocations to different application software, and prohibiting applications in different partitions from affecting each other in an unspecified manner. A set of computer resources that can be considered to be one virtual computer is called a partition.

Virtualization allows the execution of software in partitioned environments separated from the underlying hardware resources. Virtualization is widely deployed in data centers, where operating systems (OS) are executed in partitions called virtual servers. Virtualization in one physical computer enables the execution of different operating systems in different partitions. A similar virtualization principle is used in IT companies that need to test the same software product in different OS environments. Virtualization as it is today works seamlessly on one computing unit, but congestion and performance deterioration may occur when many applications use shared networking resources and produce a relatively heavy network load.

In order to apply the virtualization concept of single computer nodes to a distributed system consisting of a set of computers interconnected by a communication network such as Ethernet, it is necessary to use a communication technology that supports the partitioning of communication resources (virtual networks), such that a set of partitions in different computer nodes are allocated to one or more virtual networks, and those virtual networks do not change their assigned quality of services depending on the varying network load. Such a distributed computer system provides services with specific quality of service (QoS) guarantees for critical functions, regardless of the resource utilization, and meanwhile can execute services that do not have high QoS requirement, while maximizing the resource utilization of the distributed computer system. This means that low-latency, low-jitter and standard LAN applications can be executed in one distributed system, and at the same time communication resource utilization can be maximized without introducing delays (performance degradation) for time-critical functions.

Distributed applications executed in partitions whose execution is aligned to the network time-base, provide quality of service guarantees even under heavy workload. This allows effective development of synchronous services in large server networks or cloud computing. It is also essential for design of high-availability and mission-critical systems with deterministic performance and guaranteed quality of service.

Cloud Computing and Resources

Cloud computer is a distributed computing infrastructure consisting of a number of shared computing and networking resources and capabilities (services) which deliver QoS levels (in terms of application execution performance) to user application. Different levels of service guarantees are required for applications of different criticality. The customer is charged a fee for the use of cloud infrastructure resources and services, and expects the agreed level of service. Similarly, safety-critical or other critical embedded system applications expect guaranteed level of service provided by a computing and networking platform. Furthermore, maximized resource utilization is an essential factor for guaranteeing high levels of service quality at sustainable costs.

Each component of cloud infrastructure (computing, storage and network) can be dynamically configured to respond to changes in the performance or configuration of other elements, in many cases without significant supervision and control. However the possibility of congestions and over-booking of resources cannot be managed perfectly due to statistical nature of resource sharing either at the network or computational level.

Maximum resource utilization and quality of service guarantee based on anticipated usage patterns and taking into account expected availability of resources (computing, storage and network) shared with other applications is of significant interest for cloud infrastructure owners. This can be achieved by integration of computational and network resources in a unified infrastructure that can be used to run different distributed applications, and provide predictable quality of service guaranties for cloud computing applications as well as suitable services for critical applications over a cloud computing infrastructure.

Figure 3:
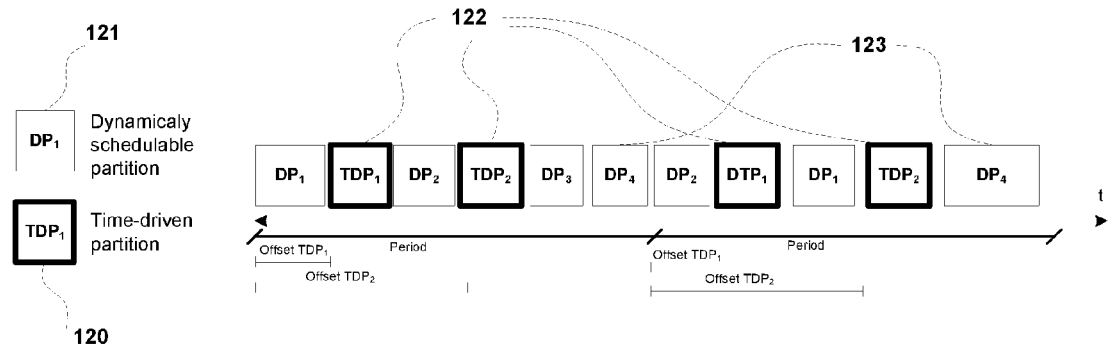
Figure 4:
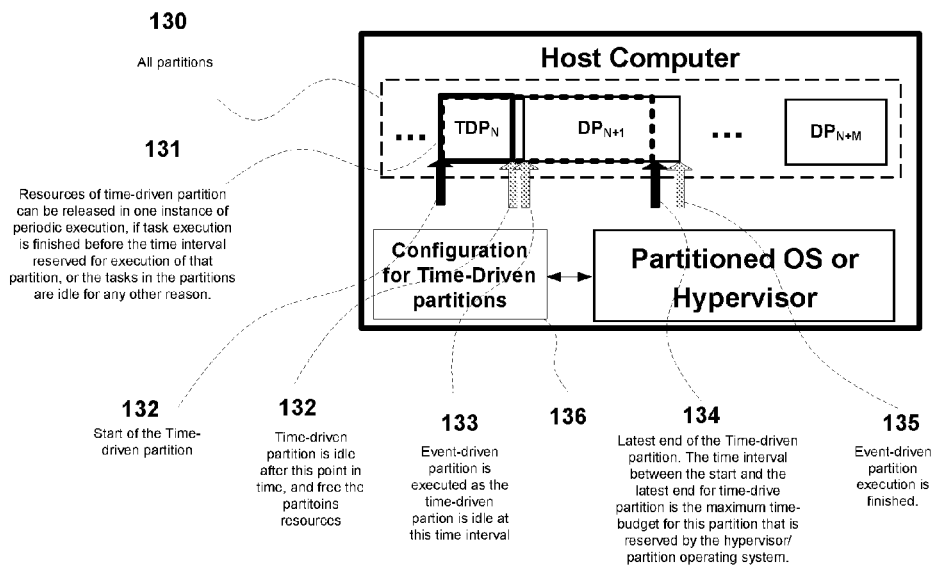
Figure 6:
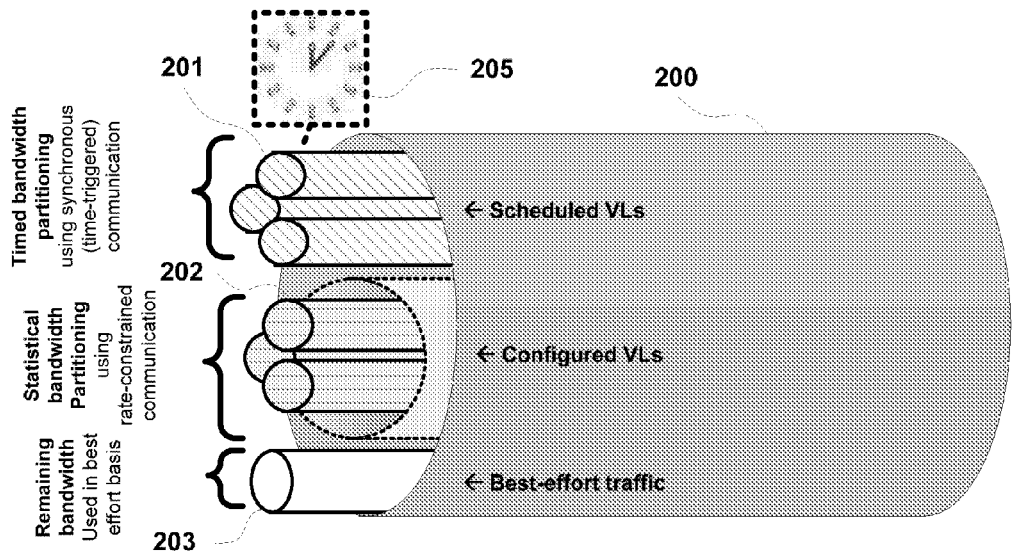
Figure 7:
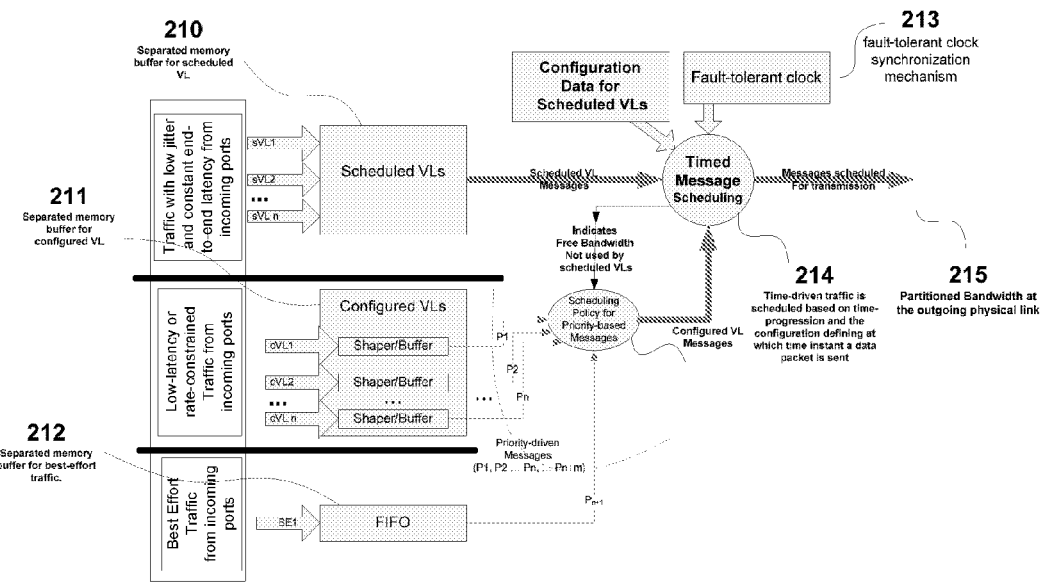
Figure 9:
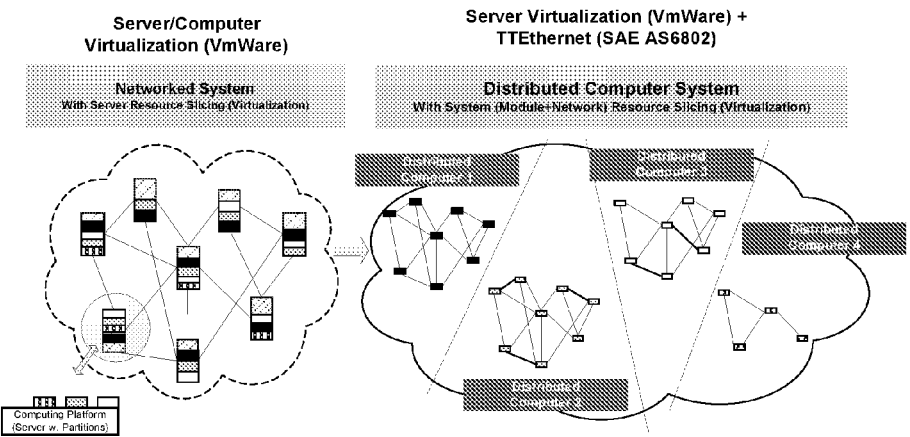
Figure 10:
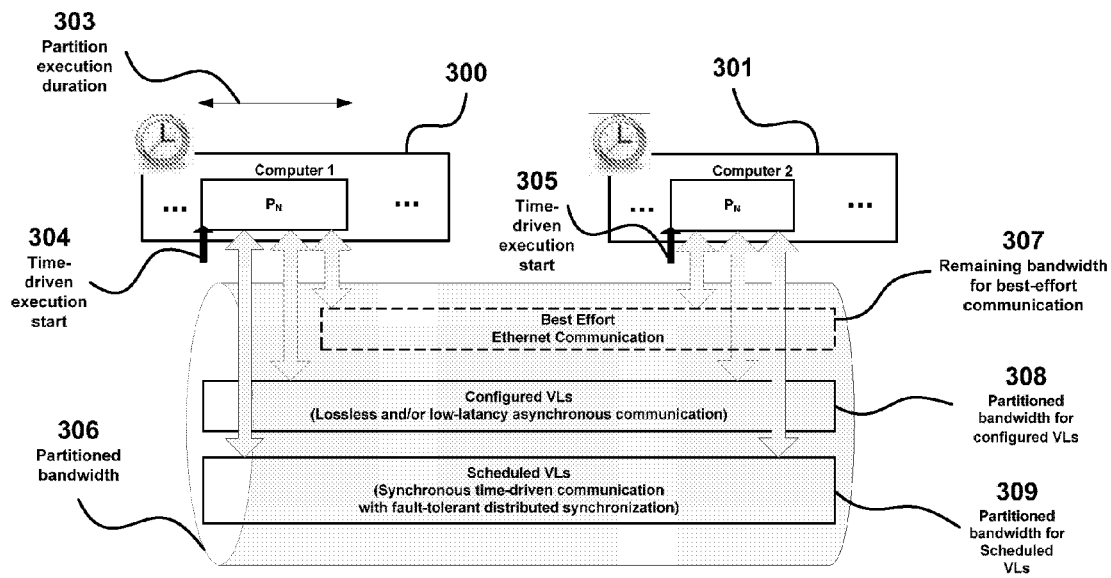

In the following the invention is described with respect to the drawing, wherein the Figures show:
FIG. 1: Partitioning of computer resources
FIG. 2: Time-driven partitions
FIG. 3: CPU time allocation to time-driven and dynamically scheduled partitions
FIG. 4: Time-driven partition finishes the execution earlier
FIG. 5: Combination of time-driven and dynamically scheduled partitions
FIG. 6: Partitioning of network bandwidth with TTEthernet
FIG. 7: Combination of TT. RC and BE traffic classes
FIG. 8: Virtualized vs. non-virtualized system
FIG. 9: Partial system virtualization vs. complete system virtualization
FIG. 10: Integration of POS and TTEthernet

PARTITIONING OF COMPUTER RESOURCES

Different technologies enable the partitioning of computation resources such that different software applications, even different operating systems can be executed into one HW (hardware) computer without interfering with each other. One major goal of these partitioning technologies is to reduce the number of computer nodes in a distributed system while optimizing the HW resource utilization. Partitioning of computational resources can be grouped in two categories:
  Hypervisor—enables the creation of virtual machines out of one physical computer, and thus enables the execution of different operating systems in different virtual machines within a single computer.
  Partitioning operating systems (POS) that allow memory, CPU and I/O are divided among statically allocated partitions. The CPU time is allocated to each partition according to static configuration data in a periodic manner, and the order of CPU allocation to different partitions is given in the configuration data. One partition can host one or multiple applications/tasks.

Partitioning of computational resources (FIG. 1) guarantees that applications executed in different partitions will not affect each other in an unspecified manner. Three major resources are subject to partitioning: CPU time (time partitioning), computer memory (space partitioning—fixed memory areas allocated to different partitions) and computer I/O (time partitioning and space partitioning). Partitioning of computational resource technologies is mainly deployed in two market segments:
  In data centers using virtual machines—e.g., VmWare is a popular candidate—supports I/O and memory partitions but no strict time partitioning, and
  In critical embedded applications, e.g., VxWorks 653 or Pike OS—supports I/O, memory partitions and time-driven partition scheduling.

Figure 2:
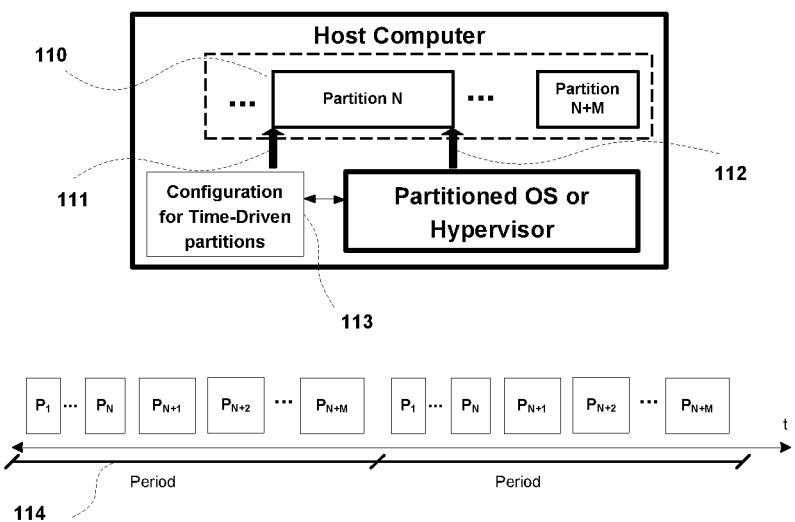

Partitioned operating systems like VxWorks 653 and PikeOS perform time-driven scheduling of partitions, where the CPU time is allocated to different partitions according to static configuration data (see FIG. 2). RAM memory is partitioned in space, i.e., different memory areas are allocated to different partitions. I/O can be allocated to different partitions either in time domain, or permanently allocated to a specific partition.

Time-driven partitions are executed with a strict periodicity and in the same order within one period. A POS or hypervisor that does not implement time-driven partitioning guarantees that the CPU time is statistically distributed to partitions over a time interval. The decision to execute a partition is done at run-time (dynamically) by using, e.g., priority based, round-robin scheduling or budget-based. Each partition has its initially allocated physical memory allocation, which remains unchanged until the next system reconfiguration. Multiple applications or tasks can be executed within one partition. Scheduling of tasks within a partition depends on the OS running within the partitions. POS with strict timing partition are suitable for mission and safety-critical applications with hard real-time constraints. POS's dynamically scheduled partitions (non-time-driven) enable the execution of applications with more relaxed time constrains (no control loops in the millisecond range) on the same hardware platform by providing statistical QoS guarantees.

In this work we propose a method for partitioning of computational resources that enables the scheduling of dynamic scheduled and time-driven partitions in the same computer system. Time-driven partitions are scheduled periodically, with a constant offset from the start of the period, and a maximum execution time. During the time interval where no time-driven partitions are active, dynamically scheduled partitions are executed. An example of execution of time-driven and dynamically scheduled partitions is given in FIG. 3. Time-driven partitions contain the following configuration data with respect to CPU time allocation: i) period, ii) time offset, and iii) maximum execution time.

If a time-driven partition (TDP) has finished the periodic execution of applications within the TDP before the maximum execution time, or the applications within the TDP are idle, the TDP can send a signal to the scheduler to inform that the TDP is idle, and the scheduler can allocate the CPU to a dynamically scheduled partition (DP).

Figure 5:
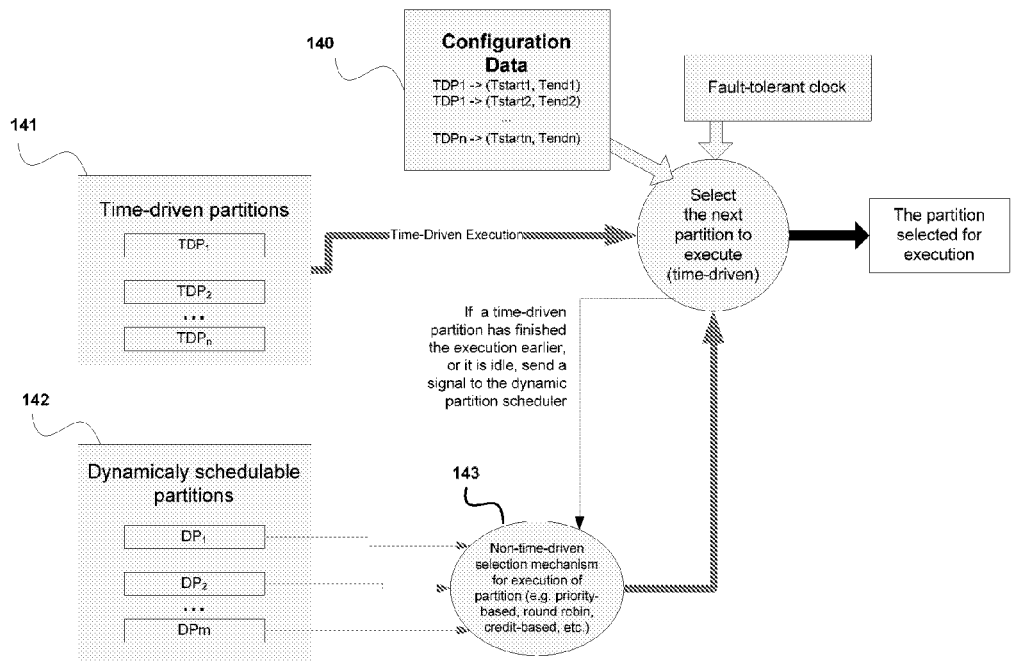

An overview of the mechanism for scheduling of dynamically scheduled and time-driven partitions in the same computer system is shown in FIG. 5.

Computer Networks and Virtualization of Network Services

For time-, mission- and safety-critical applications a predictable communication network is required that provides either statistical or deterministic QoS guarantees. Predictable real-time communication systems guarantee a message transmission within a constant transmission delay and a small and bounded jitter.

Ethernet is a frame-based computer networking technology for local area networks (LAN) and it is the most widespread communication technology. Due to the open nature of Ethernet it is difficult to guarantee bounded transmission delays in systems that use standard Ethernet networks. The duration of the message transmission over the standard Ethernet network depends on the characteristics of the network and the network load (traffic), which depends on the number and type of distributed applications in the system. Such a technology is suitable for providing flexible communication services for applications that do not have stringent timing constraints.

In computer networks we distinguish between two different scenarios: cooperative senders and competing senders. If senders are competing (as in standard Ethernet [2]) there is always the possibility that two or more messages are sent to a single receiver simultaneously. To resolve this conflict, back-pressure flow control is used, either the CSMA/CD (this is the choice of the bus-based vintage Ethernet. [3]) or the storage of the messages within the network and sending of pause frames to the sender (this is the choice of switched Ethernet). Both alternatives involve increased message transmission jitter which may be unsatisfactory from the point of view of real-time performance for predictable applications, but also create situations where lossless communication is jeopardized.

In predictable computer applications the senders in the computer network must cooperate to avoid conflicts. This cooperation can be achieved through coordination by reference to a global view of time and system status.

As Ethernet is a well established network topology, there are many approaches which try to adapt Ethernet in such a way, that it can be deployed in applications where temporal guarantees are necessary [1, 2, 3, 4, 5]. These solutions use the concept of cooperative senders in order to guarantee constant transmission delays. TTEthernet [6] is a communication technology that provides predictable services and enables competing senders to coexist with cooperative senders on the same network and preserves the temporal predictability of the traffic among the cooperative senders. TTEthernet enables the integration of competing traffic seamlessly in the same network without interference from the cooperative traffic.

TTEthernet supports the time-triggered (TT) traffic class where frames are transmitted periodically and the sending instant of a message is specified by the scheduler with respect to the global time. The schedule can either be static or dynamic. The static scheduler is executed off-line and the configuration data are generated and loaded into communication components. Dynamic configuration can be implemented in two ways:

i) a centralized dynamic scheduler may reside in one or more computers within the network and send control commands to the communication components in order to dynamically modify the schedule. The centralized dynamic scheduler has the complete view of the schedule in the network, as well the current resource utilization for the critical traffic.

ii) Communication components sending out requests for resources along a route a resource reservation protocol is implemented at the network level, and the schedule is dynamically updated. Each network component along the route can accept/deny the request. The update is done after all components along the route have accepted the request for communication resource reservation.

For TT traffic class there is a guaranteed end-to-end message transmission time and the jitter is relatively small (jitter<<latency) and bounded. By means of the TT traffic class the computer network can be partitioned, and by means of partitioning, the TT traffic class supports the concept of virtualization of distributed computing and networking resources. In a virtualized network the physical network resources can be logically divided into different parts, denoted as virtual links (VL), and these can be used as a model for developing applications independently from each other.

A virtual link can be logically considered as a separate network that interconnects two or more components. Virtualization of network services can be implemented with any time-triggered computer network, as by means of time-triggered operation no virtual link can affect the operation and timing of the other virtual links and end-to-end latency are independent from traffic load.

TTEthernet distinguishes two types of VL:
Scheduled VL—associated with (TT) traffic class, where a time slot is reserved for a virtual link,
Configured VL—associated with a rate-constrained traffic class that has a reserved bandwidth for a virtual link, according to a static configuration.
In the RC traffic class, the virtual link is defined by reserving a specific bandwidth and by implementing traffic shaping in order to limit the load of transmitted traffic by one node, without specifying the time the message is to be sent within one virtual link (VL).

Parallel to the TT and RC traffic classes, TTEthernet supports the standard Ethernet traffic class, denoted as best-effort (BE) traffic class, which uses the available bandwidth when the physical communication medium is free of the TT and RC traffic classes. The BE traffic class provides no timing guarantee (TT spare resources are used). As standard Ethernet traffic is transmitted in the time intervals where no virtual links are active, this traffic class can be assigned to applications that require flexibility in the bandwidth and have no strict QoS requirements.

The scheduled VL provides deterministic latency guarantees with small and bounded jitter ($\mu$s or less), regardless of bandwidth utilization. TT-VLs cannot affect the timing properties of each other, which simplifies resource allocation and enables deterministic operation. Adding a schedulable TT-VL to an existing system does not affect the timing properties of other TT-VLs.

The configured VL provides statistical latency guarantees with bounded end-to-end latency and bounded jitter. Compared to the TT-VL the jitter is relatively big (jitter>minimum transmission latency) and depends on the network load.

The scheduled VL, configured VL and best-effort traffic have separate memory buffers at switches and end-systems. This allows the complete partitioning of the communication network, not only in the time domain, but also in the space (memory) domain.

Figure 8:
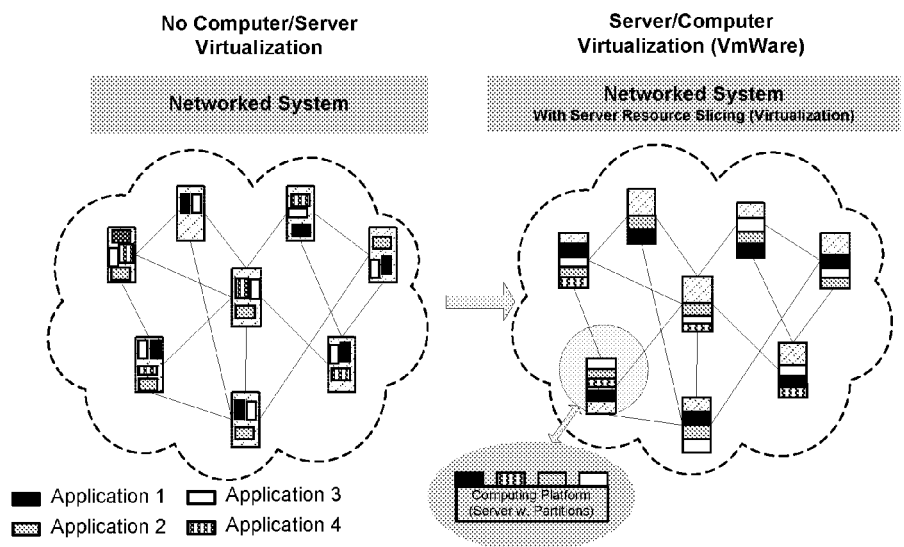

Integration of Computational Partitioning Technologies and Networks with Virtualization Service In distributed computer architectures the system is designed such that one application/function is deployed in one computer, and an application is distributed over several computers. The left-hand side of FIG. 8 shows an example of a distributed computer system, where several distributed applications are executed and several tasks of different applications are executed in one computer node. However without computer virtualization, no guarantee can be given in terms of computer resource allocation to different applications, and therefore no QOS guarantees can be provided, as different application compete for, and allocate computer resources on the best effort basis or some other stochastic allocation policy.

On the right-hand side of FIG. 8 an integrated architecture is shown that virtualizes the computer nodes and several applications are executed in one computer node but in different partitions. By means of virtualization the partitioned operating systems allocate computer resources to specified partitions, and therefore QoS guarantees can be provided within the local computer as the partitions have fixed allocated resources. Moreover the partitioning prohibits that an application in one partition affects the application in the other partition. The applications executed in partitions in this case do not compete for computational resources (as they are separated) but they will compete for communication resources.

In this work we propose the development of a distributed computer system that consists of a set of physical computers, interconnected by a network that supports virtualization of communication services like TTEthernet, where some or all computers may run a POS/hypervisor that can allocate the applications to different partitions. A computer can execute one or more partitions. An application can be allocated to one or more partitions, in one or more computers. One or more VLs can be assigned to an application. If no VL is assigned to an application, the application is considered non-critical and will use standard Ethernet traffic. Critical applications have one or more VLs. VLs are implemented with the scheduled traffic class which has fixed sending and receiving times, or with the configured traffic class which has statistical bandwidth limitations for communication between one sender and one or more receivers. The network provides a timebase (wall clock) to computing resources and allows the synchronization of the partition executions to the communication schedule.

The distributed computer system shall contain a scheduler (which can be replicated in order to avoid a single point of failure), that is capable of processing requests for partition and VL allocation for specific applications or reject them if the requested resources for a new partition within the physical computer and network segment do not match the available resources. The scheduler is capable of allocating computer resources to partitions and VLs to applications running within the partition. Also non-critical applications running in any partition can use standard Ethernet traffic. The network resources that are not used by the VL can be used for applications that use standard Ethernet traffic.

Distributed applications consist of two or more partitions which exchange data, running on one or more computing resources. One partition may execute one or more application tasks. In order to guarantee exchange of data with minimum possible end-to-end transmission latency, the partitions that execute application tasks used to exchange data (denoted as I/O tasks that perform reading/writing of application data) shall be aligned to the communication schedule with a bounded precision. This alignment is not necessary for the computers that do not have constraints for the minimal end-to-end transmission latency. In this case due to the TT communication, the worst case end-to-end latency is equal to 2 communication cycles. In order to relax this delay, RC traffic can be used instead of TT traffic.

The integration of virtualized computers with virtualized communication networks can be achieved by:

Communication networks which allow partitioning of network resources by separation of critical and non-critical traffic in one Ethernet network. The network provides a timebase (wall clock or beat) to computing resources running distributed applications. A set of computers have a means for establishing and maintaining the clock synchronization in the network.

Application tasks run in partitions on a single or several distributed computers connected by a communication network that supports partitioning of communication resources.

Distributed applications consist of two or more partitions which exchange data, running on one or several computing resources (servers, computers).

Partitions that execute application tasks used to exchange real-time data can be aligned to communication schedule with a bounded precision, such that they can guarantee exchange of data with minimum possible end-to-end transmission latency. This alignment is not necessary for the computers that do not have the requirement constrain for the minimal end-to-end transmission latency. In this case RC communication can be deployed.

Distributed applications are scheduled based on partition duration and I/O task position matching within the partition.

Communication resources that are not virtualized can be used by applications that doe not require QOS guaranties.

Thus, the invention relates to a method for providing guaranteed quality of service in distributed computing platforms for execution of distributed applications, by combining:

i) a partitioned operating system (POS) or a hypervisor (101) executed on at least two computers (300,301); where said POS/hypervisor allocates the CPU, memory and I/O hardware resources to computer partitions in said computers; where said computers are capable of executing different computer partitions (104, 105, 106) with different application tasks within one said computer partition or executing different operating systems (in case of hypervisor) within one said computer partition; wherein the said POS/hypervisor ensures that the application tasks executed in different partitions within the same said computer get their allocated hardware resources; wherein said POS/hypervisor performs a time-driven scheduling for a subset of computer partitions based on a given configuration (136), and ii) means, for example network communication technology, that implements partitioning of Ethernet communication resources and creating virtualized networks out of one physical network, where Ethernet communication is implemented by end-systems and switches; wherein the Ethernet communication bandwidth is partitioned in virtual links (VL) and allocated for communication between two or more computer partitions; where a virtual link is a communication path between one sender and one or more receivers, and a virtual link (VL) can be either a:

a) configured VL (202)—defining a sender, a set of receivers, VL priority and bandwidth reservation; where the network components guarantee that the senders do not exceed said configured bandwidth for sending frames, and switches enforce these bandwidth constrains, by guaranteeing configured bandwidth allocation, and also providing probabilistic latency guarantees, where the communication components (said switches and end-systems) contain separated memory buffers for configured VL (211), or a, b) scheduled VL (201)—defining sender, a set of receivers, maximum frame size, message period, message sending time offset with respect to the start of said period; wherein the said scheduled VL uses the mechanism to schedule frames in time (214); where said network components can be configured to postpone a transmission of a non-scheduled frame along to a transmission path at a specified time-interval prior to transmission of a said scheduled frame, in order not to delay the transmission of a scheduled frame and to keep the communication links free from non-scheduled traffic and thus provide deterministic end-to-end latency and small and bounded jitter; where the communication components (said switches and end-systems) contain separated memory buffers for scheduled VL(216), wherein bandwidth not allocated to configured VL or scheduled VL can be used for best-effort Ethernet communication (203) for non scheduled/configured frames, and non scheduled/configured frames are processed by the networking components with the lower priority; where the communication components (said switches and end-systems) contain separated memory buffers for best-effort traffic (212);

wherein said network communication technology implements a fault-tolerant clock synchronization mechanism which enables precise system time (213) for said networking component and said computers, that provides a reference for synchronizing the beginning of a schedule interval for communication schedule execution, wherein said schedule information define at least one scheduled VL;

wherein said network communication technology provides a service for aligning of the execution time of the computer connected to the network, to the partitions either to periodic communication schedule, or to the said system time wherein one said application task can send data either using said configured VL, said scheduled VL.

It is of advantage, if said application tasks executed within said computer partitions are also allowed to use the communication bandwidth (203) not allocated to any configured or scheduled VL.

It is of advantage, when a verification method is provided for guaranteeing that allocated scheduled and configured VLs and allocated time-driven computer partitions do not exceed the available physical resources of the communication network and the computer nodes.

It is of advantage, if different scheduled VLs are provided, that enable the communication of two or more application tasks executed in different computer partitions within the said distributed computer system, wherein a frame transmission time information is associated with a scheduled VL and contained in the configuration data within each network component, wherein said frame transmission time information indicates a frame transmission time at which a communication controller or a switch may transmit said frame associated with said VL; and wherein said switch forwards said frame from an incoming port to an outgoing ports based on scheduled frame forwarding time.

It is of advantage, if different configured VLs are provided, which enables a communication of two or more tasks executed in different computer partitions within said, distributed computer system, wherein said configured VL indicates a maximum bandwidth that a sending communication controller may use with frames associated with said VL.

It is of advantage, that the partitioning operating system contains time-driven computer partitions (120, 122), and non-time-driven partitions (121,123); wherein the said time-driven partitions are periodically scheduled in time (132) according to a given configuration (136); wherein the CPU resources of said time-driven partition not used in any instance of execution within one period, can be used by other partitions which are dynamically scheduled by said POS/hypervisor.

It is of advantage, if means are provided for dynamically allocating new VLs in said communication network, consisting of a centralized scheduling component of the said distributed computer system that has the overall system view of all VL allocations and is capable of processing the requests for new VL allocations, wherein the said processing includes the mechanism for denying or approving a request for new VL allocation, and in case of said approval, it includes the mechanisms for updating the configuration of the network components affected by this change; wherein said new VL can be configured not to use the bandwidth of already allocated VL's and does not affect the frame transmission times of said scheduled VL's.

It is of advantage, if means are provided for dynamically allocating new time-driven and dynamically scheduled computer partitions in one or more said computer nodes of the said distributed computer system, and assigning the existing VL to the newly allocated time-driven or dynamically scheduled computer partition; wherein the new computer partition in any of the computer nodes does not affect already existing time-driven partitions.

It is of advantage, if means are provided for dynamically releasing existing VLs in said communication network, consisting of a centralized scheduling component of said distributed computer system that has the overall system view of all VL allocations and is capable of processing the requests for VL release, wherein said processing includes the mechanism for denying or approving a request for VL release, and in case of said approval, it includes the mechanisms for updating the configuration of the network components affected by this change.

It is of advantage, if means are provided for dynamically releasing existing computer partitions in one or more said computer nodes of the said distributed computer system.

It is of advantage, if means are provided for health-status monitoring of each computer partition; wherein computer nodes periodically send diagnostic frames including the health status of the partitions and other relevant status information, further comprising a mechanism for state monitoring of all switches, wherein the switches periodically send diagnostic frames including the switch port/link health status information, buffer status and port frame statistic information.

The invention further relates to a computer for carrying out a method mentioned above.

The invention also relates to a computing infrastructure for carrying out a method mentioned above.

The invention claimed is:

1. A method for providing guaranteed quality of service in distributed computing platforms for execution of distributed applications by comprising:
    allocating CPU resources, memory resources, and I/O hardware resources of a plurality of computer systems into a plurality of partitions;
    wherein each of the plurality of partitions executes an application and a first application executed by one of the plurality of partitions does not interfere with execution of a second application executed by another one of said plurality of partitions;
    ensuring that the application tasks executed in each different one of the plurality of partitions hardware resources allocated to the particular one of the plurality of partitions-by performing a time-driven scheduling for a subset of the plurality of the partitions based on a given configuration;
    partitioning network communication bandwidth into a plurality of virtual links that each have a separate memory buffer in each component of a communication network wherein each of the plurality of virtual links is one of a configured virtual link and a scheduled virtual link wherein the configured virtual link includes a defined sender, a defined set of receivers, a virtual link priority and a bandwidth reservation where a network components, guarantee that the defined sender does not exceed the configured bandwidth for sending frames and switches in the communication network enforce bandwidth constrains by providing the configured bandwidth for the virtual link and also provide probabilistic latency, guarantees, and wherein the scheduled virtual link has a defined sender, a defined set of receivers, a maximum frame size, a message period, and a message sending time offset with respect to the start of the message period wherein the scheduled virtual link uses a mechanism to schedule frames in time where the network components are configured to postpone a transmission of a non-scheduled frame along a transmission path for a specified time-interval prior to transmission of the scheduled frames in order not to delay the transmission of the scheduled frames and to keep the communication links of the communication network free from non-scheduled traffic to provide deterministic end-to-end latency as well as small and bounded jitter;
    allocating the plurality of virtual links between the plurality of partitions;

where a allocating communication bandwidth not allocated to the plurality of virtual links network communication wherein best effort communications are processed by the networking components with the lower and the communication network components memory buffers for best-effort traffic;

implementing a fault-tolerant clock synchronization which enables precise system time for components of the communication network and the plurality computers, wherein the fault-tolerant clock synchronization includes providing a reference for synchronizing the beginning of a schedule interval for communication schedule execution, and the schedule information defines at least one scheduled virtual link; and aligning the execution time of the plurality of computers connected to the network; and aligning the execution time of each of the plurality of partitions to one of a periodic communication schedule, and a synchronized network time.

2. The method of claim 1 further comprising allowing an application executed by one of the plurality of partitions to use the communication bandwidth (203) not allocated to one of the plurality of virtual links.

3. The method of claim 1 further comprising a guaranteeing that each of said plurality of virtual links and plurality of partitions do not exceed the available physical resources of the communication network and the plurality of computers.

4. The method of claim 3 further comprising enabling the communication between two or more application tasks executed by different ones of the plurality of partitions wherein frame transmission time information associated with a scheduled virtual link is contained in the configuration data within each network component, wherein said frame transmission time information indicates a frame transmission time at which a communication controller may transmit a frame associated with the scheduled virtual link and wherein said communication controller forwards the frame associated with the scheduled virtual link from an incoming port to an outgoing port based on scheduled frame forwarding time.

5. The method of claim 3 further comprising enabling communication between two or more tasks executed by different ones of the plurality of partitions wherein a configured virtual link indicates a maximum bandwidth that a sending communication controller may use with frames associated with configured virtual link.

6. The method of claim 3 wherein the plurality of partitions include time-driven computer partitions and non-time-driven partitions wherein the said time-driven partitions are periodically scheduled in time according to a given configuration the CPU resources of a particular time-driven partition not used in any instance of execution within a time period are used by other ones of the plurality of partitions.

7. The method of claim 6 further comprising dynamically allocating a new partition of the CPU, memory, and I/O hardware resources of the plurality of computers and assigning an existing one of the plurality of virtual links to the new partition wherein the new partition does not affect already existing time-driven partitions in the plurality of partitions.

8. The method of claim 7 further comprising dynamically releasing an existing one of the plurality of partitions in the plurality of computers.

9. The method of claim 3 further comprising dynamically allocating a new virtual link in the communication network wherein the dynamically allocating denying or approving a request for the new allocation of the new virtual link, updating the configuration of the network components affected by the new virtual link wherein said new wherein the new virtual link configured not to use the bandwidth of the other ones of the plurality of virtual links and does not affect the frame transmission times of the scheduled virtual links in the plurality of virtual links.

10. The method of claim 9 further comprising dynamically releasing an existing one of the plurality of virtual links in said communication network wherein said dynamically releasing includes the mechanism for denying or approving a request for release of the particular existing virtual link and updating the configuration of the network components affected by the release.

11. The method of claim 3 further comprising monitoring a health-status of each the plurality of partitions; wherein each of the plurality of computers periodically send diagnostic frames including the health-status of each of the plurality of partitions and other relevant status information; and monitoring a state of the network components wherein the network components periodically send diagnostic frames including the port/link health status information, buffer status and port frame statistic information.

* * * * *